Aug. 26, 1924.

L. SWISHER

SECTIONAL BUILDING

Filed Oct. 4, 1921

1,506,267

6 Sheets-Sheet 1

INVENTOR
BY Lamont Swisher
ATTORNEY

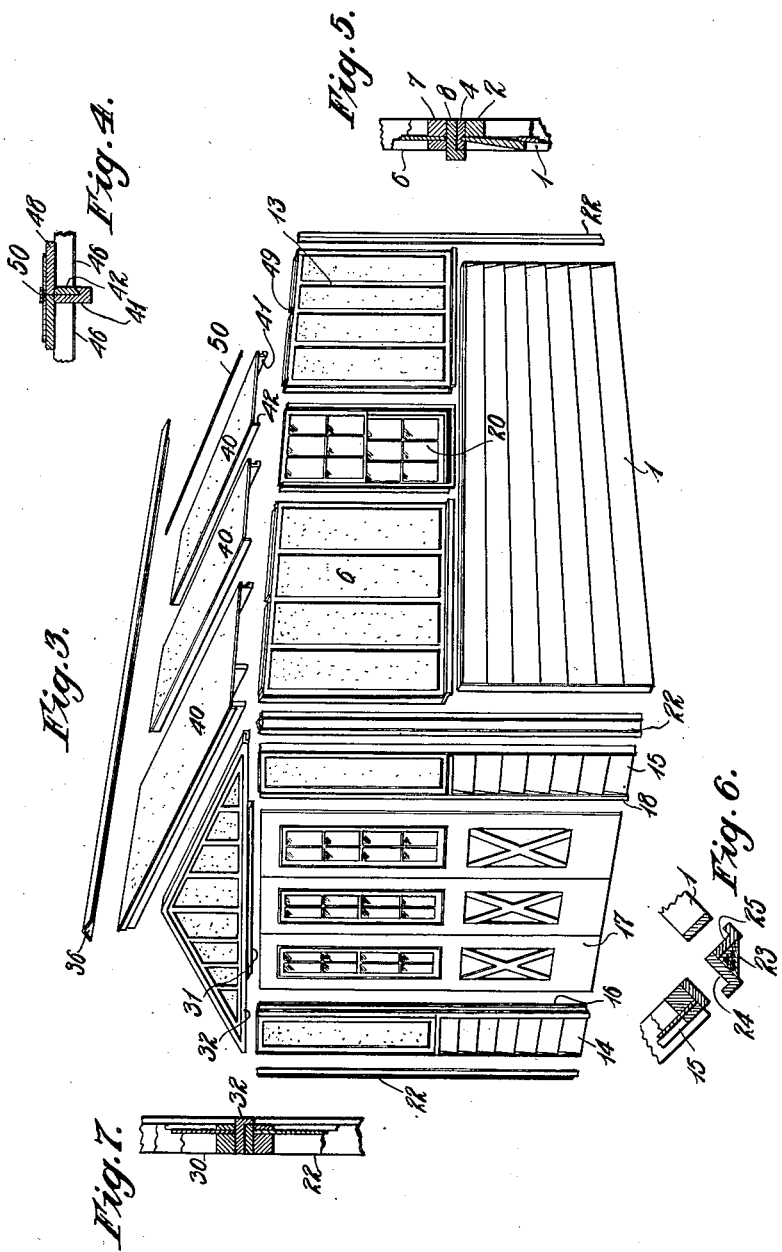

Aug. 26, 1924.
L. SWISHER
SECTIONAL BUILDING
Filed Oct. 4, 1921
1,506,267
6 Sheets-Sheet 3
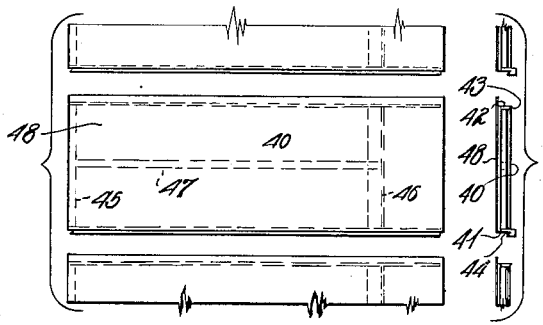
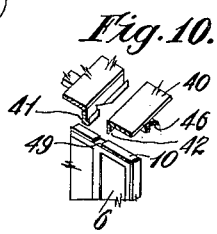
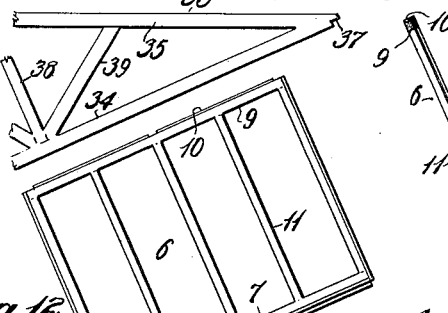
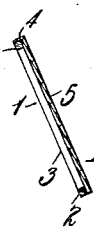
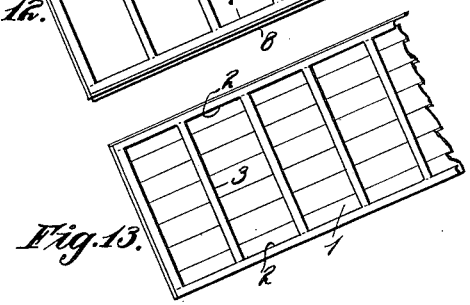
INVENTOR
Lamont Swisher
BY
ATTORNEY Aug. 26, 1924.

L. SWISHER

SECTIONAL BUILDING

Filed Oct. 4, 1921

1,506,267

6 Sheets-Sheet 4

INVENTOR
Lamont Swisher
BY
Wm. H. Finucel
ATTORNEY

Aug. 26, 1924.

L. SWISHER

SECTIONAL BUILDING

Filed Oct. 4, 1921  6 Sheets-Sheet 5

INVENTOR
Lamont Swisher
BY
ATTORNEY

Aug. 26, 1924.  
L. SWISHER  
1,506,267

SECTIONAL BUILDING

Filed Oct. 4, 1921  6 Sheets-Sheet 6

INVENTOR  
Lamont Swisher  
BY  
ATTORNEY

Patented Aug. 26, 1924.

1,506,267

UNITED STATES PATENT OFFICE.

LAMONT SWISHER, OF DECATUR, ILLINOIS.

SECTIONAL BUILDING.

Application filed October 4, 1921. Serial No. 505,256.

*To all whom it may concern:*

Be it known that I, LAMONT SWISHER, a citizen of the United States, residing at Decatur, in the county of Macon and State of Illinois, have invented a certain new and useful Improvement in Sectional Buildings, of which the following is a full, clear, and exact description.

This invention relates to portable sectional buildings.

The invention consists of a building of the character referred to, made up of standardized panels or sections, which may be readily assembled, and clamps for holding the panels or sections when assembled, as I will proceed now to explain and finally claim.

Figure 1:
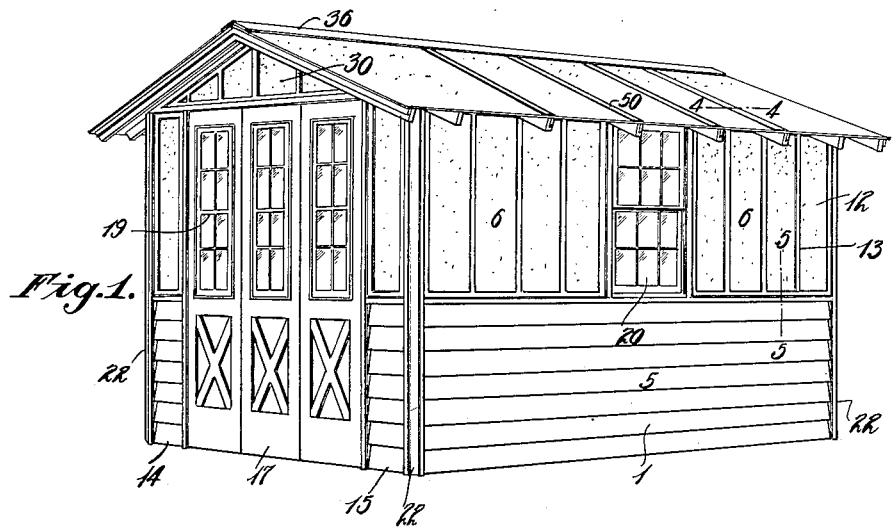
Figure 2:
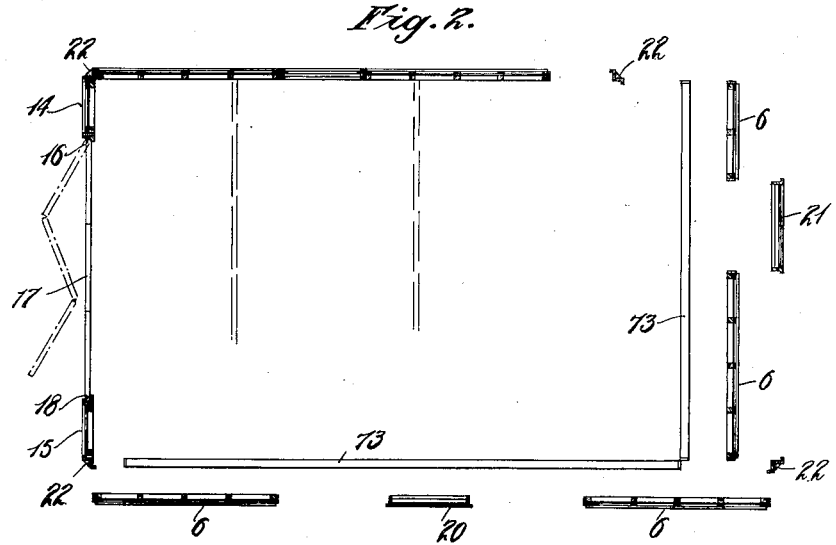
Figure 16:
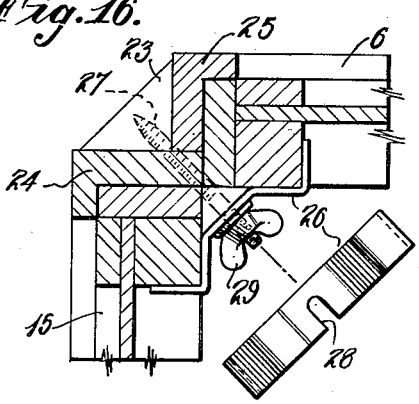
Figure 17:
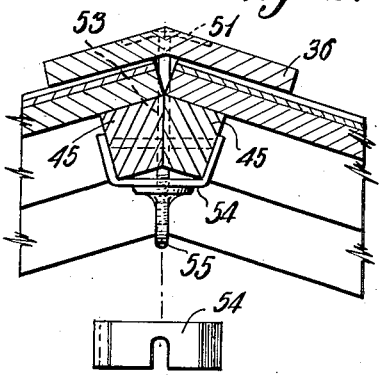
Figure 18:
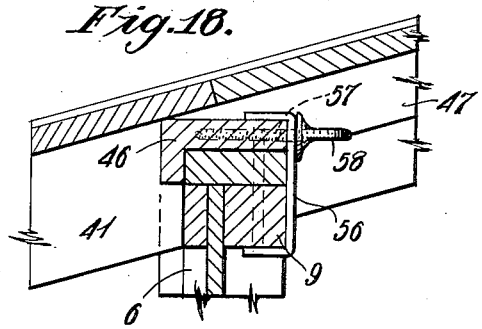
Figure 19:
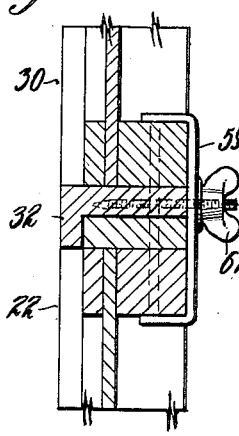
Figure 20:
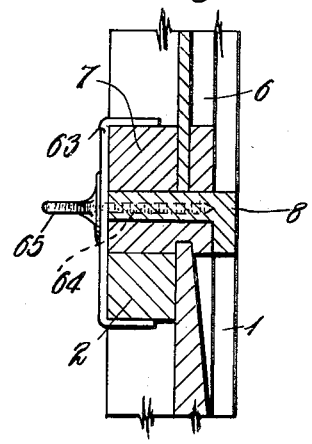
Figure 22:
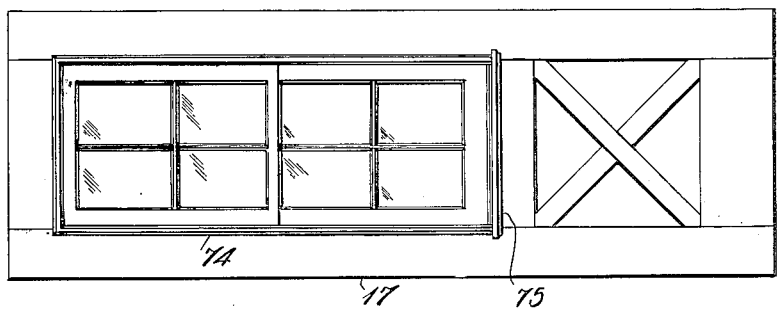
Figure 23:
Figure 24:
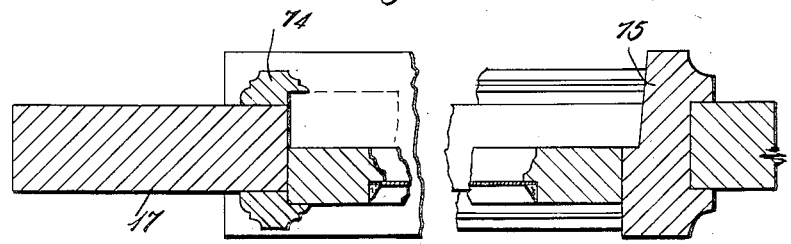
Figure 25:
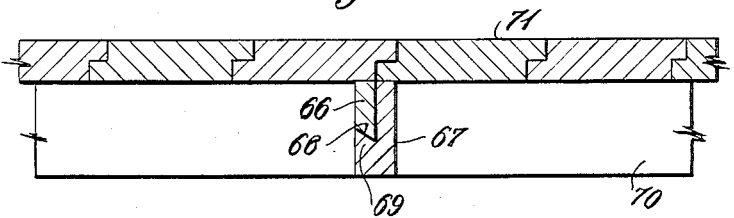
Figure 26:
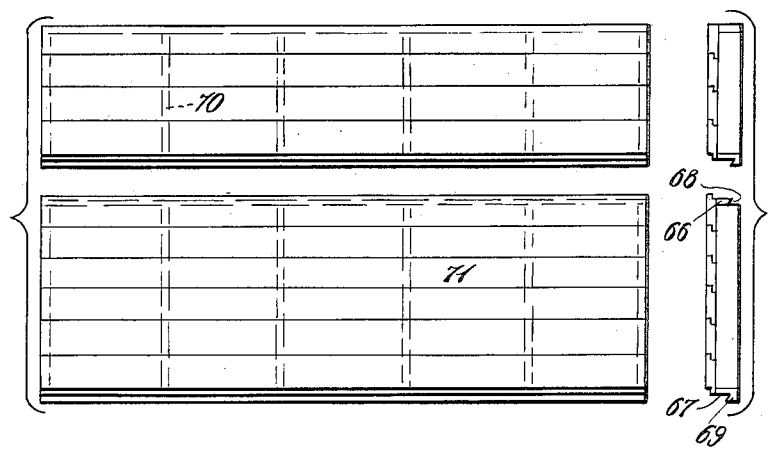
Figure 27:
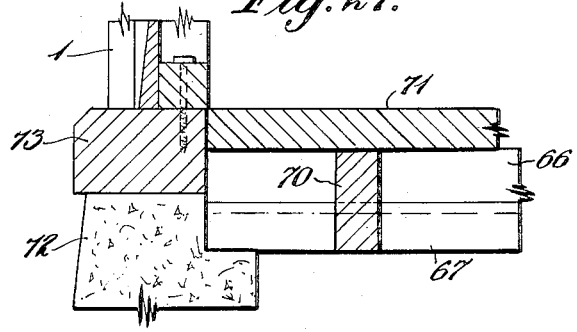

In the accompanying drawings illustrating the invention, in the several figures of which like parts are similarly designated, Figure 1 is a perspective view illustrating my invention as applied to a garage. Fig. 2 is a sectional plan view showing one side and the front assembled, and the remainder detached. Fig. 3 is a perspective view of the various parts detached, but ready for assembly. Fig. 4 is a section on a larger scale taken in the plane of line 4—4, Fig. 1, illustrating details of the roof panels. Fig. 5 is a section taken in the plane of line 5—5 of Fig. 1, illustrating details of the side panels. Fig. 6 is a horizontal section of a corner post and the adjacent ends of the front and side panels. Fig. 7 is a vertical section through one of the front panels and the gable panel. Fig. 8 shows in plan view and in edge view one whole roof panel and parts of two adjacent roof panels. Fig. 9 is an edge view partly in section of one of the roof panels. Fig. 10 is a perspective view illustrating the means for connecting the roof panels with the eaves. Fig. 11 is an elevation of part of the roof truss; Fig. 12 is an elevation of part of one of the upper side panels, and Fig. 13 is an elevation of part of one of the lower side panels. Fig. 14 is a section of the panel shown in Fig. 12, and Fig. 15 is a section of the panel shown in Fig. 13. Fig. 16 is a horizontal section on a larger scale illustrating the construction and clamping feature at the corners. Fig. 17 is a vertical section illustrating the roof construction and clamping feature at the ridge. Fig. 18 is a vertical section illustrating the eaves construction and the clamping feature. Fig. 19 is an enlarged section like Fig. 7 with the clamping feature added. Fig. 20 is an enlarged section like Fig. 5 with the clamping feature, the clamping plate used in connection with these last two features being shown detached in Fig. 21. Fig. 22 is a plan view of one of the door panels, and Fig. 23 is an edge view thereof. Fig. 24 is a sectional detail on a larger scale of the door window construction. Fig. 25 is a cross-section illustrating the floor construction. Fig. 26 shows in plan view and edge view two of the floor sections. Fig. 27 is a longitudinal section illustrating another feature of the floor construction.

The invention is herein shown as applied to a portable sectional garage, but it is to be understood, of course, that the invention is applicable to structures not only for storage but also for living and other purposes. However, the structure selected for the drawings illustrates the principle of the invention, and the same will be explained in connection therewith without, however, thereby limiting the invention; it being further understood that structural changes are permissible and contemplated as being within the scope of the claims following.

The lower course may consist of one or more panels 1, made up of longitudinal sills 2, vertical strips 3, and engaging strips 4, forming a frame, and the weather-proof covering material 5, preferably lap-siding.

The upper course may consist of any desired number of panels 6, each comprising a sill member 7 and an L-shaped sub-sill member 8, a cap member 9 and an engaging strip 10 and uprights 11, these parts forming a frame which receives an outer surface of some suitable waterproof material 12, such as gypsum board, although lap-siding, sheet-iron or lumber of any suitable sort may be used. These upper course panels may be ornamented with wood or composition shingles or other material. If gypsum board, sheet metal or sheathing lumber are used for the outside finish, then batten strips 13, Fig. 3, may be applied.

The front of the structure may be made up of panels similar in construction to the lower and upper course panels just described, and as indicated at 14 and 15, respectively. One edge of one of these front panels is provided with a jamb 16 for the reception of the door 17 which may be of any suitable construction, same being here shown as made up three panels connected in bellows form. The other front panel is provided with a jamb 18 against which the door closes and to which it may be locked. As shown, the door sections may be provided with fixed or movable window sash 19, as presently explained.

The back of the structure, as shown in Fig. 2, may likewise be of panel construction similar to the side construction, and both the side construction and the back construction may be provided with windows 20 and 21 having fixed or movable sash.

The sides, front and back are connected by suitable corner posts 22, of like construction. Each corner post is made up of three pieces, 23, 24 and 25, suitably united, see Figs. 6 and 16. Piece 23 is of triangular cross-section, while pieces 24 and 25 are of L cross-section and one of greater width than the other so as to overlap the edge of the narrower piece when assembled. These L-shaped pieces 24 and 25 receive the vertical edges of the lower and upper course panels in the form of butt-joints, and the corner posts and panels when thus assembled are rigidly united by any suitable means, such as clamping plates 26 applied to screws 27 engaging the corner posts and projecting inwardly so as to engage notches 28 in the clamping plates 26 and receive butterfly or other nuts 29.

If a pitched roof is to be used, then gables 30 will be provided for the front and rear, and these gables may be made up of one or more panels of the same general construction as the side panels and adapted to receive the front panels and the door. The lower sill 31 of the gables extends the width of the door panel and forms a jamb for it, while the subsill 32 is L-shaped in cross-section and extends the full length of the gable.

The roof truss 33 shown in Fig. 11 in part, may comprise a tie-beam or plate 34 and rafters 35. The cooperating ridge pole is designated 36. The tie-beam or plate has the rabbets 37 at each end to engage the engaging strip or plates 10 at the top of the upper panels. When necessary or desired, especially when the span is greater than the ordinary roof rafter would suffice to support its burden, then these trusses may be provided with a queen-post 38 and braces 39.

The roof also may be made of panels 40, as shown in detail in Figs. 3, 4, 8, 9, 10 and 17. These roof panels may comprise rafter members 41 and 42, arranged at opposite edges of the panels, the member 42 being cut or extracted from the member 41 so as to have a bevel edge 43 which fits into a complementally bevelled flange or ledge 44 on the member 41, so that when panels having these rafter members on adjacent edges are joined, as in Fig. 4, they make not only an engaging joint, but also a close fit. These rafter members are connected transversely by means of the bevelled ridge-tree members 45 and the L-shaped plate 46, left from cutting out a plate member such as that designated 10 in Fig. 14 or 4 in Fig. 15. This plate is secured to the rafter members at an angle suitable to engage the plate member 10 of the upper side course and permit the proper pitch of the roof.

The ridge-tree member 45 and the L-shaped plate 46 may be connected by longitudinal frame members 47.

The members 41 and 42, 45, 46 and 47 constitute a frame which may be covered with any suitable material 48, such as gypsum board, sheathing lumber, sheet iron or other material, nailed or otherwise applied thereto.

As shown in Fig. 10, the plate 10 may be notched at 49 to receive the rafters of the roof panels.

These roof panels may have their joints covered by means of the battens or strips 50 to insure weather-tight joints.

When the roof panels are assembled, (see Fig. 17), the small metal plates 51 are placed above the ridge pole 36 and bolts or screws 53 depend from this plate and extend through the ridge-tree members 45 of the roof panels, these bolts being engaged by notched clamping plates 54 similar to the clamping plates previously described, and then the parts are drawn tight by means of clamping nuts 55 applied to the bolts 53. Other suitable clamping means may be used.

Fig. 18 shows one form of locking device for connecting the roof panels with the side panels, same consisting of the notched clamping plate 56 adapted to be engaged by the screw 57 driven into the plate 46, said clamping plate engaging the plate 46 of the roof panel and the member 9 of the side panel, and being held firmly in place by means of the clamping nut 58.

Figure 21:
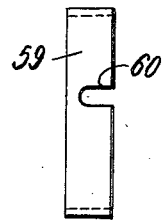

Fig. 19 shows the means for clamping together the gable 30 and the front panels 14—15, same consisting of the clamping plate 59 having the notch 60, Fig. 21, which engages a screw 61 inserted in the L-shaped tie-beam 32 of the gable and engaged by a clamping nut 62.

Fig. 20 shows the manner of clamping the upper and lower course panels, same consisting of the clamping plates 63 notched as shown in Fig. 21 and adapted to engage screws 64 inserted in the L-shaped member 8, and having a projecting end engaged by the clamping nut 65.

By the use of the clamping devices herein described, the parts of the building may be readily and securely united without nails or other fastenings, it being understood that the clamping plates may be of various designs so long as they are provided with parts which clasp portions of the panels or other structures to be united and adapted to be connected with a securing or tightening element.

I have described the corner posts as composite, and this construction is an economical and entirely efficient one, but if desired these corner posts may be made solid or of one integral piece.

If the building is to have a floor, this floor also may be made in sections, substantially as illustrated in Figs. 25 to 27. In this case the sections may comprise interlocking floor beams 66 and 67, the beam 66 at one side of the panel being shorter than the beam 67 at the other side of the panel, and having a beveled edge 68 which fits into a complementally beveled flange or ledge 69 in the other member, so as to form a tight, close-fitting joint, these beams running lengthwise of the floor panels and being supported by cross-beams 70. These beams 66 and 67 may be cut or extracted from a single piece of lumber. On the frame thus made the floor boards 71 are fastened. This floor construction is so tight as practically to exclude the air, and thus makes a warm floor.

The floor beams may be laid on a cement or other footing 72, and these footings may support plates 73 upon which the lower course panels are mounted, substantially as shown in Fig. 27.

As shown in Figs. 1 and 3, the roof panels at the front and rear may be extended so as to form eaves, and these panels are also extended to form eaves at the sides of the building. The roof may be extended also to form part of a porch.

The door panels are made in any suitable way, as previously explained, and where they contain movable window sash that are adapted to slide by each other, the construction illustrated in Figs. 22, 23 and 24 may be followed. The window opening in the door panel has grooves for the sash formed by the moldings 74, and the sill 75 is suitably formed to receive the sash, in weather-proof manner.

By the construction described the joints between panels are practically concealed from view, thus greatly enhancing the symmetrical and pleasing finish of the building, and making it weather-tight.

Inasmuch as the assembly of the parts has been fairly fully described in the foregoing explanation of the construction, it would seem to be repetitious to enlarge upon this feature.

What I claim is:—

1. A sectional building, including a series of panels having frames made of bevelled complemental parts one of which is cut or extracted from the other and adapted to be fitted together when the panels are assembled.

2. A sectional building, including a series of panels having frames one member of which is narrower than the other and has a bevelled edge, and the other member has a complemental beveled flange to receive and engage the bevelled edge member of an adjacent panel.

3. A sectional building, having roof panels provided with complemental bevelled rafter members one of which is narrower than the other and this other member flanged, the two members adapted to interlock when assembled, and means for securing the assembled panels.

4. A sectional building, having side and end panels made as separable units, and corner posts for uniting these panels vertically, said posts comprising pieces triangular in cross-section and L-shaped side pieces, the latter adapted to receive the edges of the panels in butt-joint fashion, clamps engaging the adjacent ends of the side and end panels on the interior of the building, and means to detachably fasten the said clamps to the corner posts.

5. A sectional building, having side and end panels made as separable units, and corner posts for uniting these panels vertically, said posts comprising pieces triangular in cross-section and L-shaped side pieces, the latter adapted to receive the edges of the panels in butt-joint fashion one of the side pieces being longer than the other and overlapping the adjacent edge of the latter.

In testimony whereof I have hereunto set my hand this first day of October A. D. 1921.

LAMONT SWISHER.

Witnesses:
HAZEL BRADSHAW,
W. V. STROM.